United States Patent
Berengoltz et al.

(10) Patent No.: US 9,740,567 B2
(45) Date of Patent: Aug. 22, 2017

(54) SYSTEM AND METHOD FOR SECURED BACKUP OF DATA

(75) Inventors: Pavel Berengoltz, Petah-Tikva (IL); Leonid Dorrendorf, Maale Adumim (IL); Edward Almer, Kfar Saba (IL)

(73) Assignee: Safend Ltd., Tel Aviv (IL)

( * ) Notice: Subject to any disclaimer, the term of this patent is extended or adjusted under 35 U.S.C. 154(b) by 0 days.

(21) Appl. No.: 13/514,048

(22) PCT Filed: Dec. 7, 2010

(86) PCT No.: PCT/IL2010/001032
§ 371 (c)(1),
(2), (4) Date: Jun. 5, 2012

(87) PCT Pub. No.: WO2011/070571
PCT Pub. Date: Jun. 16, 2011

(65) Prior Publication Data
US 2012/0246472 A1     Sep. 27, 2012

Related U.S. Application Data

(60) Provisional application No. 61/267,548, filed on Dec. 8, 2009.

(51) Int. Cl.
*H04L 29/06*     (2006.01)
*G06F 11/14*     (2006.01)
(Continued)

(52) U.S. Cl.
CPC ...... *G06F 11/1448* (2013.01); *G06F 21/6218* (2013.01); *H04L 9/0897* (2013.01); *H04L 63/0428* (2013.01); *H04L 63/102* (2013.01)

(58) Field of Classification Search
CPC ......... G06F 21/6218; G06F 2221/2107; G06F 21/6209; G06F 21/602; H04L 63/0428
(Continued)

(56) References Cited

U.S. PATENT DOCUMENTS 5,765,173 A * 6/1998 Cane ................... G06F 11/1453
                                                           707/640
6,665,709 B1 * 12/2003 Barron ......................... 709/217
(Continued)

FOREIGN PATENT DOCUMENTS

WO     WO 2009/083971      7/2009

OTHER PUBLICATIONS

Anoop Singhal; SP 800-95 Guide to Secure Web Services; Aug. 2007; NIST; Full Text.*
(Continued)

*Primary Examiner* — Dant Shaifer Harriman
*Assistant Examiner* — Stephen Sanders
(74) *Attorney, Agent, or Firm* — Eitan, Mehulal & Sadot

(57) ABSTRACT

A system and method of selectively providing encrypted data is provided. Embodiments of the invention may store data in encrypted form on a storage device. Embodiments of the invention may selectively provide encrypted or decrypted data to a requestor of data based on configuration or other parameters. A filter driver or other module or unit may examine a request for, or communication of data from the storage device and may determine if data is to be provided in encrypted or decrypted form. Decrypted data may be provided to a caching system. A filter driver or other module or unit may examine a request for, or communication of data from the caching system. Data provided from the caching system may be selectively encrypted based on configuration or other parameters.

7 Claims, 3 Drawing Sheets

(51) Int. Cl.
*G06F 21/62* (2013.01)
*H04L 9/08* (2006.01)

(58) Field of Classification Search
USPC .......................................................... 713/165
See application file for complete search history.

(56) References Cited

U.S. PATENT DOCUMENTS

| | | | |
|---|---|---|---|
| 7,650,328 B2* | 1/2010 | Hori et al. | 707/751 |
| 7,716,746 B2* | 5/2010 | Hori et al. | 726/30 |
| 7,743,260 B2* | 6/2010 | Fetik | 713/193 |
| 7,945,788 B2* | 5/2011 | Roberts et al. | 713/192 |
| 8,352,679 B2* | 1/2013 | Wolfe et al. | 711/118 |
| 2005/0066187 A1* | 3/2005 | Peinado et al. | 713/193 |
| 2006/0200260 A1 | 9/2006 | Hoffberg et al. | |
| 2007/0050620 A1 | 3/2007 | Pham et al. | |
| 2007/0239948 A1* | 10/2007 | Muraki et al. | 711/162 |
| 2007/0250937 A1 | 10/2007 | Ginter et al. | |
| 2010/0281223 A1* | 11/2010 | Wolfe | G06F 12/0808 711/133 |

OTHER PUBLICATIONS

Diane Barrett; Viurtualization and Forensics; Aug. 2010; Syngress Publishing; Full Text.*
International Search Report mailed on Mar. 30, 2011, for PCT International Application No. PCT/IL2010/001032.

* cited by examiner

SYSTEM AND METHOD FOR SECURED BACKUP OF DATA

CROSS-REFERENCE TO RELATED APPLICATIONS

This application is a National Phase Application of PCT International Application No. PCT/IL2010/001032, International Filing Date Dec. 7, 2010, entitled "SYSTEM AND METHOD FOR SECURED BACKUP OF DATA", published on Jun. 16, 2011 as International Publication No. WO 2011/070571, which claims priority from U.S. Provisional Patent Application No. 61/267,548, filed Dec. 8, 2009, both of with are incorporated herein by reference in their entirety.

BACKGROUND OF THE INVENTION

A large and increasing portion of the information handled in today's modern office environment is digital. Many organizations, institutions and establishments store, handle and manipulate most of their information, and/or information associated with their activities, in digital forms. In many cases, such information may include confidential, secret or otherwise sensitive information, which, in the wrong hands, may cause serious damage to the owner or keeper of the information and/or to those associated with the owner or keeper of the information. Uncontrolled information flow is a recognized problem in various industries, organizations and environments. For example, commercial organizations, government agencies, academic institutions and/or health care facilities may all be at risk of sensitive information being provided to unauthorized, possibly hostile entities.

Sensitive data may typically be stored in encrypted form, and may be decrypted when required. For example, when an authenticated user requests access to encrypted data, the encrypted data may be decrypted and provided. Evidently, a security risk exists when ever data which is otherwise encrypted is being decrypted.

Sensitive data, which may also be vital or essential to the operation of the owner of the data, may typically be duplicated or backed up, for example, in order to avoid loss of such data. However, current systems and methods expose such sensitive data to security risks during a backup procedure and/or as a result of a backup. For example, encrypted data may be decrypted before being provided to a backup agent or system and may further be stored in decrypted form on a backup system.

Furthermore, current backup systems impose various limitations or constraints on a recovery of backed up data. For example, a recovery may need to be performed on or with relation to the computing device associated with the related backup procedure, e.g., restoration of backed up data may be required to be done to or on the original device. There is a need in the art for a system and/or method to enable secured backup of sensitive data and/or a recovery of backed up data on a device or location of choice.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
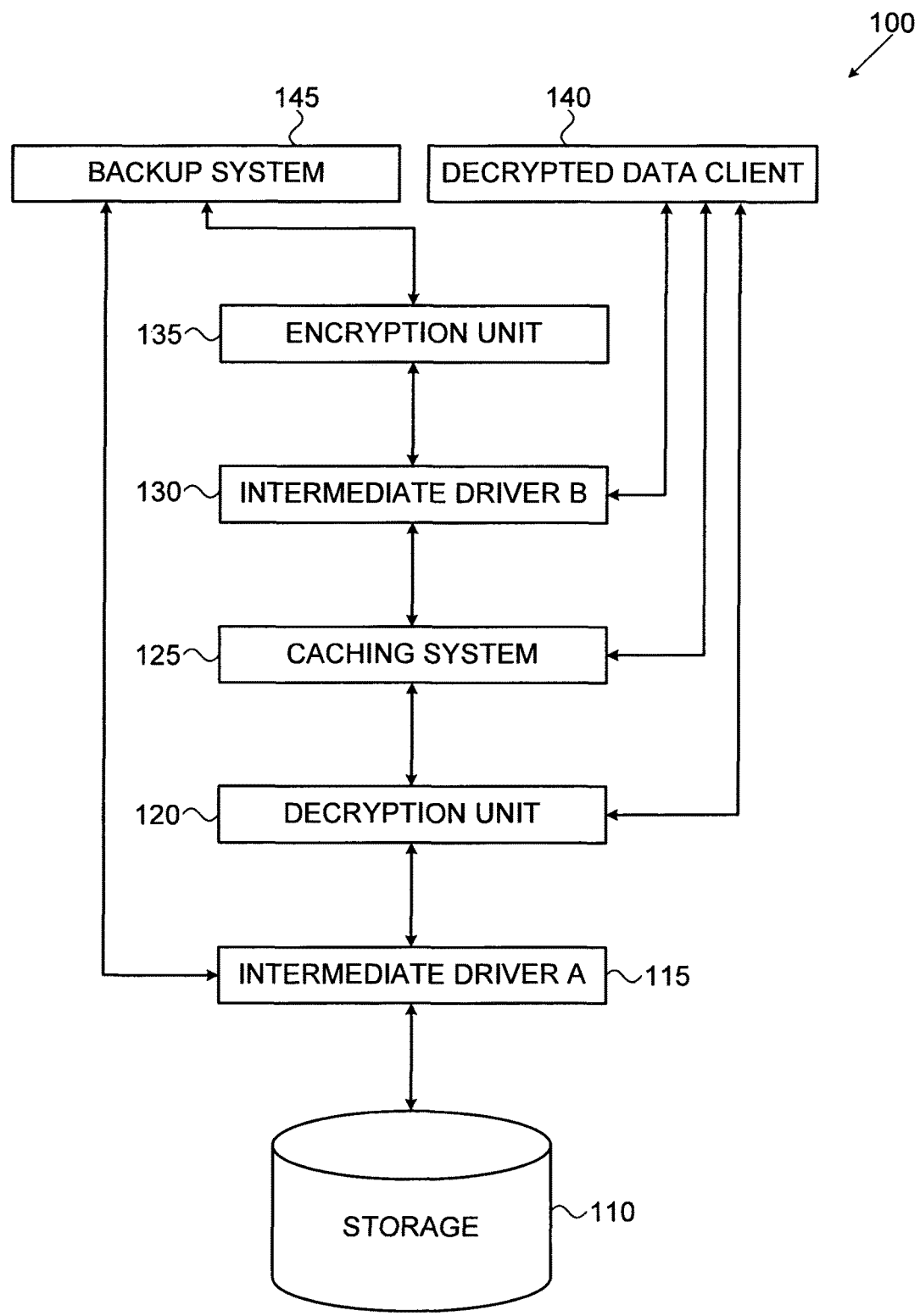
FIG. 1 is a schematic block diagram of a system according to embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Securing sensitive or other information typically comprises encrypting information and storing such encrypted information. Such measures may disable unauthorized users, applications or other entities from accessing, viewing or otherwise using sensitive and/or protected information. In prior art systems, possibly in response to a request that may originate from a user, an application or from a backup system or agent, information may be decrypted and provided. Accordingly, in prior art systems, sensitive information that is to be backed up may be communicated and/or delivered in decrypted, also known as "open" form.

For example, in a Windows® operating system environment, when a backup system or agent is to backup information or data, it requests the information by interacting with a component of the operating system known as a "file system". For example, such file system may be a NT® file system (NTFS®). A procedure for obtaining data from a file system in such environment may be, for example, as described in "A Developer's Guide" by Rajeev Nagar. It will be recognized that while the description herein may refer to NTFS® or use terms that may be associated with NTFS®, any applicable file system and/or operating system may benefit from embodiments of the invention, accordingly, embodiments of the invention are not limited to a specific operating system or file system.

Typically, an encryption system is integrated with an operating system and/or a file system. For example, a requestor for data from a file system may first be authenticated by the operating system and, contingent on an authentication, data is provided by the file system. For example, if an authenticated user is logged in, then a request for encrypted data causes a decryption and providing of the data as it may be assumed that in attended mode, e.g., when an authenticated user is logged in, sensitive, encrypted data may be freely decrypted and provided. Accordingly, no distinction is made between requests for data made by a backup system and any other requestor, e.g., a user or application. Such implementation by current systems has a number of undesirable aspects. For example, backup of data may be impossible in unattended mode as requests for data from a file system may be denied, e.g., by the operating or a security system, if or when no user is logged in. Accordingly, unattended backup mode enabled by embodiments of the invention as described herein may be impossible by such systems, e.g., providing a backup agent with sensitive data when no user is logged in or is actively operating the relevant computing device.

Another drawback of current implementations is the fact that sensitive data may be provided in decrypted form (also known as "open" or plaintext in the art) to the backup system as requests for data originating from a backup system and from a user are handled in the same way as described herein. Yet another deficiency of current systems is the fact that sensitive data provided in decrypted form to a backup system is also stored, e.g., on a backup server, in decrypted form thus causing a serious security risk or hole. Since information is stored on a backup system in decrypted form, by breaking into or hacking a backup system, such information may be obtained and readily used by hostile users. An additional problem resulting from current implementations and systems is the fact that as sensitive data may be communicated, e.g., over a network, in decrypted form, tapping, eavesdropping, intercepting or otherwise obtaining sensitive information or data while it is being communicated is possible.

Furthermore, security and/or encryption systems typically impose various constraints on data clients in general and specifically on backup systems or agents. For example, a backup agent may need to be authenticated prior to being served with data, various attributes of data being backed-up may need to be preserved or observed, e.g., access rights, modification time etc. Furthermore, a backup agent may need to be authorized to access the data, it may preferably be required to transmit the data securely, e.g., without exposing it to possible eavesdroppers, a backup system may preferably be required to store the data securely, protecting it against unauthorized retrieval. Moreover, upon request or in other cases, restoration or retrieval of backed-up data may need to comprise restoring various aspects or attributes, e.g., access permissions, modification time, encryption parameters etc. However, backup agents are typically developed by independent software vendors, unrelated to the developers and/or vendors of encryption or security systems. Accordingly, in current systems, integrating a security system and a backup system may be costly, e.g., in terms of time and labor. Such costs may be encountered not only upon initial installation but with every update, e.g., software version updates, of either the security or encryption system and of the backup system.

Current systems are unable to separate an operation of a backup agent or system from an operation of other applications and/or users. For example, protection of data may be dependant on the user logged in or operating the relevant computing device. For example, when an authenticated user is logged in, encrypted data may be decrypted upon request regardless of who the requestor is. Furthermore, a single or same criteria, set of encryption/decryption keys and other security aspects may be in place and may be relevant to the data but not to the client of the data. Accordingly, current systems are unable to enforce a first set of security measures related to a user and a second set of security measures related to a backup procedure. Such configuration or implementation may be problematic when incompatible security measures are required for a user and a backup agent or system. For example, backing up information while a user with limited access rights is operating the relevant computing device may be impossible since the user is not permitted to access or view the data and accordingly, data may not be decrypted as may be required by the backup system.

As described herein, the present invention solves the problems described above, enables operational modes that are impossible to realize with current systems and offers advantages that can not be achieved by prior art. For example, a security enhancement is enabled by providing encrypted data to a backup system rather than providing decrypted data as done by some prior art systems. A distinction that may be made between backup agents or systems and other data clients may enable selectively providing encrypted or decrypted data based on various aspects of the data client or requestor. Such distinction may further enable embodiments of the invention to manage various security related aspects in the context of backup. For example, a first set of encryption/decryption keys may be associated with a backup system and a second set of such keys may be maintained for other clients, e.g., users or applications. Metadata or other parameters or information may be maintained and associated with data. Such metadata may be used when data is provided to a backup agent and when data is restored from a backup system. For example, such metadata may enable restoring various attributes of backed-up data, e.g., permissions, access rights, modification time etc.

Unattended backup mode may be enabled by embodiments of the invention, for example, by identifying the requestor of data as a backup agent and providing the backup agent with encrypted data, thus enabling a secure backup procedure to take place at times when no user is logged in or when the computing device is otherwise unattended or unsupervised. The benefit of such unattended mode may be at least two fold, e.g., security is enhanced as data is provided in encrypted form and further, backup procedures may be scheduled to occur during times when computing devices are idle, e.g., at night or during off hours. Since, according to some embodiments of the invention, data may be stored in encrypted form, the security risk encountered by prior art as described above may be eliminated, as even if a backup system is hacked and/or backed-up information is otherwise obtained by unauthorized entity, such obtained information may be useless when possessed or held by unauthorized entities.

Embodiments of the present invention may enable seamless and effortless integration of backup systems and security systems. According to embodiments of the invention, any backup system may be integrated with any security or encryption system as described herein. For example, a backup agent may operate as a regular data client as described herein, accordingly, no constraints may be imposed on the backup agent, it needs not know or be aware of internal aspects of the security system. Accordingly, integration aspects may be reduced or eliminated. As backup agents or systems are typically provided by vendors, manufacturers or providers that may be separate or other than the providers of security or encryption systems, such easy integration may be a highly desirable feature in the industry. As described herein, commercial or other backup agents from a first provider may be freely used and/or easily integrated with security and/or encryption systems from another provider in a way that is impossible according to prior art systems. For example, any backup agent may be integrated or made to operate with any a security system without any modification of the backup agent.

With regard to a separation or distinction of operation of a user and that of a backup procedure, embodiments of the invention enable breaking the linkage made by prior art between security aspects related to a user and those related to a backup system. As described herein, embodiments of the invention enable an operation of a backup system or procedure that is independent from operations related to a user or other applications on a given computing device or system. For example, a secured backup of data stored on a computing device may be performed while a user is logged in and operating the computing device. Moreover, while or in cases when the user may be restricted from accessing the data, a backup agent may still access the data and may further securely backup the data. In other scenarios, the same data may be provided to both a user and a backup agent where such providing is according to respective security rules or criteria that may be not be the same for the user and the backup agent. Accordingly, the user may be able to access the data normally while the data is being backed up.

Reference is made to FIG. 1 showing exemplary components of an exemplary system 100 according to embodiments of the invention. According to embodiments of the invention, system 100 may comprise storage device 110, an intermediate driver A 115 (also referred to herein as "driver 115"), a decryption unit 120, a caching system 125 an intermediate driver B 130 (also referred to herein as "driver 130"), an encryption unit 135, a backup system 145 and a decrypted data client 140. Components of system 100, their operational and/or functional aspects are further described herein.

According to embodiments of the invention, storage devices 110 may be an internal or external hard drive or disk, or it may be a random access memory (RAM), a dynamic random access memory (DRAM), a RAM disk, a non-volatile storage chip, a removable storage media, universal serial bus (USB) storage device, network storage device, a FLASH storage device, backup storage, a tape drive, an optical media, for example, a write-once or rewritable optical media such as a compact disc (CD), a digital video disc DVD, a high definition (HD) DVD, or a Blue-Ray™ disk or any other suitable storage device or media.

According to embodiments of the invention, storage 110 may be formatted or otherwise manipulated by an application. For example, an application may format storage 110 according to any, possibly proprietary and/or secret, convention, rules or logical view. For example, any, possibly commercial file system may be implemented on storage 110. According to embodiments of the invention, information stored on storage 110 may be encrypted. For example, sensitive or secret information may be encrypted prior to being stored on storage 110. Alternatively or additionally, encrypted information may be obtained from any source and stored on storage 110, e.g., in files in a file system. Although a single storage device 110 is shown in FIG. 1, it will be understood that any number of devices, units or storage systems may be used without departing from the scope of the invention.

According to embodiments of the invention, intermediate driver A 115 may monitor interactions with storage 110, for example, requests to a file system or other structure on storage 110. Driver 115 may intercept attempts to access information on storage 110. For example, driver 115 may be a kernel level module configured to detect, receive, monitor, intercept or otherwise obtain requests made to a file system related to storage 110 and may further determine an action that may be performed in relation to a request to access information on storage 110. It will be recognized that interacting with a file system or a storage device may include any applicable operation. For example, intermediate driver A 115 may intercept or otherwise obtain information related to a read operation, write operation, a modification of a file or other information object, e.g., modifying an attribute such as read permissions. Accordingly, requests to read, write, delete, modify or otherwise manipulate information or data on storage 110 may be examined by driver 115 and an action may be performed based, for example, on logic incorporated into driver 115. It will be recognized that although intermediate drivers such as drivers 115 and 130 are described herein, such drivers are an exemplary module or unit used for the sake of clarity and simplicity. Other suitable drivers, modules or units may be used when storage devices other than a disk drive containing a file system are used. For example, if storage 110 is a tape drive and data on such tape drive is not organized in a file system then a different intermediate driver may be used, such different driver may implement some or all functionalities described herein with relation to intermediate driver A 115.

According to embodiments of the invention, driver 115 may perform a recognition or identification of a backup agent. Driver 115 may identify a requestor, destination or client of data. For example, a client or destination of data provided from a storage device or file system associated with a computing device. Driver 115 may determine, detect, recognize, identify, obtain or assert any classification, categorization or other parameters related to a delivery of data, in particular, the client, requestor or destination of the data. Exemplary parameters that may be determined or obtained by driver 115 may be a process identification, process name, user identification or name or application identification parameters. Driver 115 may also verify that a recognized backup agent is to be supported, e.g., provided with data. For example, a backup agent running as a local process may be recognized by driver 115 using a Requestor Process ID, available through standard APIs as known in the art. Driver 115 may then obtain the backup agent's process name from a list of processes as described herein, and may verify, based on such or other list or parameter that the backup agent is indeed to be provided with data or otherwise supported. For example, a list of supported backup agents may be examined by driver 115 in order to verify that a backup agent is to be provided with data. Any aspects of interaction between driver 115 and a backup agent may be reflected in a list or configuration file or in parameters otherwise provided to driver 115 and may accordingly be adhered to or otherwise observed by driver 115 when interacting with a backup agent.

According to embodiments of the invention, remote backup agents may be supported. For example, a backup agent running on a remote machine or computing device, for example on a central server, may issue file system requests through network shares, e.g., shared drives as implemented by a number of commercial operating systems or other file sharing mechanisms. In such cases, driver 115 may identify a requestor, e.g., the remote backup agent, by checking the request's driver stack for network shared drives, and/or the security credentials associated with the request. Driver 115 may use information retrieved from a driver stack in a similar way as described herein with respect to local backup agents.

According to embodiments of the invention, based on an identity of a requestor that may be extracted from a request for data, driver 115 may direct requested data from storage 110 to decryption unit 120 or it may provide or cause providing requested data directly, e.g., provide data in encrypted form. For example and as shown by the arrow connecting blocks 115 and 145, driver 115 may determine that data from storage 110 is to be provided to a backup system, e.g., backup system 145. Such determination may be based on recognizing or identifying the requestor of the data as a backup agent. For example, driver 115 may intercept a request from backup system 145. Driver 115 may further examine the request and identify the source of the request and/or the destination of a communication of data that may result from the request. For example, driver 115 may determine the identity of the requestor and/or the destination, location or entity to which data will be provided as a result of the request. For example, as known in the art, a request directed to a file system may include parameters such as a process identification (process ID), a pointer or reference to be used as a destination of data that may be communicated as a result of the request etc. Such parameters may be examined by driver 115 and may enable driver 115 to perform tasks described herein.

According to some embodiments, if a request for data is from a backup system or backup agent, encrypted data stored on storage 110 may be provided "as is", e.g., provided in encrypted form. It will be noted that backup system 145 may reside on a remote computing device, accordingly, data to be backed up may be communicated over a network in encrypted, encoded or otherwise protected form. Determining that a request for data is from a backup agent or system may be based on any applicable parameter. For example, in many operating systems (OS), each process running under the OS is assigned a process identification parameter known as process ID in the art, additionally, each user is associated with a user identification parameter or number, known in the art as a user ID. In some systems, when a user runs a process or causes a process to run, the process ID may be related to the relevant user ID, parameter or number. According to one embodiment, a backup process may be associated with a virtual backup user. Accordingly, remote backup requests may be locally executed by such backup user, for example, remote backup agents may run with credentials of a specific user associated with backup tasks. An identification parameter, e.g., the user ID associated with a backup process may be provided to embodiments of the invention, e.g., to driver 115 and/or driver 130. Accordingly, driver 115, driver 130 and/or another module or unit may identify a request and may associate the request with a backup process or procedure. Any parameter or security identifier related to a process, user or other relevant entity, operation, activity, state or context may be used to identify requests as described herein, for example, in order to determine if data is to be provided in encrypted form (e.g., to a backup system or agent) or decrypted form (e.g., to an authenticated user.

Communicating data in encrypted form to a backup system rather than communicating unencrypted or otherwise unprotected data has obvious security benefits, e.g., tapping, sniffing or otherwise obtaining data communicated may be pointless and/or useless as encrypted data may not be readily used by an entity unauthorized to view the data. Although some embodiments of the invention may manipulate data prior to delivering it to a backup system, e.g., modify an encryption or other aspects or parameters, according to other embodiments, encrypted data may be provided to a backup agent or system in its original, encrypted form. Delivering encrypted data as stored may have a number of advantages. For example, key management access rules may be preserved, accordingly, there is no need to maintain duplicate rules, namely, one set of rules for the encryption system and another set of rules for the backup system (as done by current, prior art systems). Another advantage that may be appreciated by a person of ordinary skill in the art may be related to a recovery of backed up data. When encrypted data is delivered to a backup system in its original encrypted form, a restoration or recovery of backed up data may be performed according to known rules, permissions and access permissions, e.g., according to the same rules, criteria and/or parameters that apply to the original data during regular use, accordingly, embodiments of the invention may greatly simplify a recovery process by eliminating the need to maintain and manage parameters, configurations and other aspects both for the backup/recovery and regular use of data.

Although intercepting, receiving or otherwise obtaining requests for data from a storage device may be performed by driver 115 as described herein, embodiments of the invention are not limited in this respect. For example, instead or in addition to intercepting or obtaining requests for sensitive data, system 100 may be configured such that some or all data retrieved, provided or communicated from a storage or other device is routed to a unit such as driver 115. Such configuration may enable driver 115 to determine if data will be provided in encrypted form or open form even without examining the related request, e.g., the request which resulted data communication from the storage device. Such configuration may enable driver 115 to control data flow as described herein even without obtaining the requests that trigger data delivery. Whether by intercepting a request, being provided with the data or utilizing other means, driver 115 may determine one or more actions to be performed in relation to data delivery from the relevant device. For example, driver 115 may determine that no data is to be provided, for example, based on a black list containing users, applications or other entities that may not be authorized or permitted to view or obtain specific or all content on a storage device. Alternatively or additionally, driver 115 may determine that data will be provided in encrypted form as described herein or in decrypted or "open" form.

According to embodiments of the invention, driver 115 may be provided with a list or other structure of configuration parameters that may include users, applications or other relevant entities and their respective attributes, permissions, authorizations or any relevant parameters. Such list or configuration parameters may further associate specific data objects, volumes, folders or files with specific permissions or parameters and/or specific users or destinations of data delivery. Accordingly, driver 115 may selectively provide or cause providing decrypted or encrypted data to a requestor of data where such selective providing may be based on preconfigured or dynamic rules, criteria or parameters as described herein.

According to embodiments of the invention, driver 115 may perform any applicable operation on or related to data provided. For example, driver 115 may manipulate attributes of data provided or it may manipulate the data itself. For example, driver 115 may modify the original access criteria or aspects of key management applied to an original file provided as described. For example, driver 115 may preserve, change or add some of the following: an authorization for multiple users to view or change a file, key recovery mechanisms parameters, one-time access mechanisms parameters or any other parameters related to a file being delivered. As described herein, such operations performed by driver 115 may be according to a special security policy that may be installed in the encryption system and pertaining specifically to backup procedures, specifically to a specific backup agent or specifically to any applicable condition, circumstances or context. Accordingly, embodiments of the invention may enable detaching, disassociating or otherwise breaking the linkage between a backup procedure and other operations. For example, a first security policy may be applied to a backup procedure while a second security policy may be applied to users or applications that may be associated with the same computing device or system. For example, encryption of data provided to a backup agent may be according to a first set of encryption keys while encryption of data stored on the computing device may be according to a second set of encryption keys. Likewise, access permissions or other attributes of files or other content objects may not be the same for backed-up data and for data stored locally. As described herein, a list or other configuration file or object may be examined by driver 115 in order to perform any applicable manipulation of data prior to delivering the data to a backup agent. Such configuration parameters may include any security policy parameters or information and/or any other required parameters.

As shown by the arrow connecting blocks 115 and 120, filter driver 115 may provide or cause providing data from storage 110 to decryption unit 120. Decryption unit 120 may be any suitable decryption unit and may be or comprise hardware, software, firmware or any combination thereof. For example, decryption unit 120 may be a software module or an add-on card that receives encrypted data as input and provides decrypted data as output. Decryption unit 120 may reside on the same computing device hosting storage 110 and/or driver 115 or it may reside on a remote computer, in which case provisions may be in place to enable communicating data to be decrypted to unit 120. In the case where unit 120 resides on the same computing device as driver 115 and/or storage 110 then a memory or data bus may be used to provide unit 120 with data to be decrypted. Delivering of data from storage 110 to decryption unit 120 may be performed or instructed by driver 115 if it is determined that data is to be delivered in decrypted or open form. For example, if driver 115 determines that the destination or client of the data is an authorized user then driver 115 may direct the data to decryption unit 120 such that the actual data delivered to the user is decrypted and may be readily used.

As shown by the arrow connecting blocks 120 and 140, decrypted data may be provided to a consumer or client of decrypted data. For example, an authenticated user may be provided with decrypted data. For example, upon logging in or upon requesting access to data a user may provide a password or other authenticating parameter. Based on an authentication of a user that may be recorded by driver 115, encrypted data stored on storage 110 may be decrypted by decryption unit 120 and the resulting decrypted data may be provided to the user as shown. Having an intermediate unit such as decryption unit 120 enables embodiment of the invention to integrate with other systems, sub-systems, modules and/or configurations. For example, not all access to a cache system may be controlled or filtered. For example, memory mapped I/O may involve direct access to a cache memory as known in the art. As described herein, storing both encrypted and unencrypted data in a cache system may result loss of data integrity, coherence or be otherwise undesirable as known in the art. The problem of utilizing a cache system to handle both encrypted and unencrypted data is solved by some embodiments of the invention by a dual layer encryption/decryption configuration. In such configuration, decryption unit 120 may decrypt data and provide decrypted data to a cache system and encryption unit 135 mat encrypt decrypted data received from the caching system and provide decrypted data.

In some embodiments, a consumer or client of decrypted data may be a user, in other embodiments it may be an application, program or any suitable entity. For example, client 140 may be a service running on the relevant computing device or an anti-virus application authorized to examine data in order to search for viruses. Any entity authorized to view or otherwise access data stored on storage 110 may be provided with decrypted data as shown. For example, a list of authorized applications, users or services may be examined by filter driver 115. Such list or configuration parameters may further associate data clients with specific data objects. If the request for the data is received from a user or application in such list and/or the requested data object is further indicated in the list as one that may be provided in decrypted form to the client, then data may be provided in decrypted form according to the path shown by arrows connecting storage 110, driver 115, decryption unit 120 and decrypted data client 140. Alternatively or additionally, driver 115 may examine data arriving from storage 110, determine a destination of the data and, according to the destination and a configuration list listing destinations and their respective permissions, determine if the data is to be provided as well as the form of provided data, e.g., provide encrypted data, provide decrypted or block the transfer of the data.

A request from a backup agent may be identified as such by filter driver 115 and may result in providing encrypted data as shown by the path indicated by the arrows connecting blocks 110, 115 and 145. It will be noted that while a backup system is shown as receiving encrypted data in FIG. 1, any suitable entity may similarly, e.g., based on rules or parameters described herein, receive encrypted data upon request. For example and as described herein, driver 115 may be provided with a list of applications, users or any suitable entities that, upon request or other conditions, are provided with encrypted data, decrypted data or are restricted from accessing, and accordingly, receiving, any data from storage 110.

For example, a first user may be authenticated and provided with decrypted data as described herein, a second user may be restricted from accessing and/or viewing data on storage 110 and accordingly may be provided with no data, e.g., driver 115 may block a transfer of data to such restricted second user, and a specific application may be only provided with encrypted data. For example, a utility used for copying data from storage 110 to another storage system may be listed in a list or configuration parameters accessible to driver 115. In such list or configuration parameters, such copying utility may be indicated as one that may receive data in encrypted form only. Accordingly, such copying utility may be provided, upon requesting data from storage 110, with encrypted data. the result may be that while such utility may be useful in copying and/or communicating data, such utility may be prevented from exposing data stored on storage 110 to security risks described herein.

As shown by block 125, system 100 may include a caching system. As known in the art, data may be provided through, via or by a caching system that may improve efficiency and other aspects of data delivery in a computing device. However, in some cases, data provided to a caching system may subsequently be provided to users or applications that may be permitted to view such data as well as to users or applications that are to be prevented from being provided with decrypted or open data or plaintext. For example, according to embodiments of the invention, data originating from storage 110 and provided to caching system 125 may subsequently be provided by caching system 125 to a backup agent or system in encrypted form or to another application in decrypted or open form.

According to embodiments of the invention and as shown, decrypted or plaintext data provided to caching system 125 may be encrypted or re-encrypted prior to being delivered. Accordingly, embodiments of the invention may enable utilizing a caching system while preserving security of data by selectively restricting access to, or delivery of sensitive data and/or selectively limiting exposure of data to predefined clients, users, applications or other relevant entities. According to embodiments of the invention, driver 130 may intercept, be provided with or otherwise obtain requests for data from caching system 125 and may further determine if such requests are to be satisfied and/or whether data provided in response to, or as a result of, such requests is to be provided in encrypted form or in open, decrypted form. For example, driver 130 may have access to a list or configuration file that associates users or data clients with respective permissions and/or respective data objects. In some embodiments, some or all lists or configuration parameters used by driver 115 as described herein may be used by driver 130.

For example, a list or other configuration parameters object may include multiple fields entries, where a first field in an entry may contain an identification such as a user name, process identification, process name or any other suitable identification, a second field in an entry may indicate whether data is to be delivered in encrypted or decrypted form, a third field in an entry may list data objects that may not be delivered to the associated user and a fourth field may list storage devices or folders that may be accessed by the associated user or process. Other fields in an entry may include any applicable parameters upon which a decision related to data delivery may be based. Such list, configuration file or other object may be accessible to or otherwise shared by driver 115 and/or driver 130 or it may be compiled into such drivers.

As known in the art, a caching system may be used in order to increase speed and improve efficiency of data delivery. For example, when using a caching system, rather than providing data from a storage device, data may be provided from a caching system. However, current systems are unable to deliver both encrypted and decrypted data using a single caching system. If both encrypted and decrypted data are stored in a caching system then inconsistencies are likely to arise, possibly causing data corruption or jeopardizing data integrity. An innovative solution of embodiments of the invention comprises a dual encryption layer and intermediate drivers. According to embodiments of the invention, data may be stored in encrypted form on a storage device, may be decrypted prior to being provided to a caching system and, if needed (e.g., as determined by an intermediate driver), may be re-encrypted when delivered from the caching system. Such innovative solution enables embodiments of the invention to concurrently, or substantially at the same time, provide decrypted and encrypted data through a single caching system. For example, embodiments of the invention may concurrently provide, from a single caching system, encrypted data to a backup agent, e.g., as shown by blocks 245 and 255 in FIG. 2, and decrypted data to an authenticated user or application, e.g., as shown by blocks 245 and 250 in FIG. 2.

In some embodiments of the invention, if a requestor of data or the destination of data is a backup agent or system, then driver 130 may direct data from caching system to encryption unit 135 as shown by the arrows connecting blocks 125, 130 and 135. Encryption unit 135 may encrypt data that may have been decrypted by decryption unit 120, and may further provide encrypted data to the backup agent as shown by the arrows connecting blocks 135 and 145. Alternatively, if a requestor of data from caching system 125 is an authenticated user or application, or is otherwise to be provided with decrypted data, e.g., according to parameters in a list described herein, driver 130 may provide or cause providing data from caching system 125 to the requestor, for example, as shown by the arrows connecting blocks 125, 130 and 140.

Yet another path data from caching system 125 may take according to embodiments of the invention is shown by the arrow connecting blocks 125 and 140. Such path may be a direct path bypassing caching filter driver 130. For example, memory mapped input/output (I/O) operations may be such that no filtering of data is performed prior to data being delivered from the caching system. For example and as known in the art, possibly based on model or API, an application may open a file as memory mapped file. In a configuration where backup agents may not use memory mapped I/O, memory mapped I/O operations as described herein may be freely performed. Accordingly, embodiments of the invention may coexist with such configurations.

As described herein, encrypted data may be stored in a caching system and provided from the caching system, for example, in unattended mode. According to some embodiments of the invention, it may be determined that a computing device is unattended. For example, if no user is logged in. Other examples may be an activation of a screen saver application may be used as an indication that the computing device is unattended. It may also be determined that a computing device is unattended during a specific period of time, e.g., late night hours. The term "unattended" as used herein refers to any mode, state or operational mode a computing device may assume when idle, partially idle or otherwise not functioning on behalf of, or being operated by, a user or a specific application. For example, a computer may assume unattended mode if no interaction from a user is detected for a specific period of time or if only maintenance or background applications are active. Any method as known in the art may be used in order to determine a computing device is idle or unattended.

When a computing device is unattended, embodiments of the invention may purge the caching system of the computing device and may provide encrypted data to the caching system. Such encrypted data may be further provided to a backup system that may backup information stored by the computing device. Typically, backup may be performed during times when a computing device is otherwise idle, accordingly, the paradigm described herein is a favorable one. When a computing device is unattended or is not performing tasks for an authenticated user or application, or is unattended as described herein, a caching system may be used by embodiments of the invention in order to speed up delivery of data to a backup system. According to embodiments of the invention requests to access data during or while a backup is performed may be denied for all but a backup agent. For example, drive 115 may block any attempt to open files or otherwise access files in a file system during such time. Such blocking of access may ensure that decrypted data is not stored in the caching system together with encrypted data. For example, if an application that is to be provided with decrypted data is allowed to receive decrypted content while encrypted content is being delivered to a backup agent then encrypted and decrypted data may both be stored in the caching system, leading to unfavorable results as described herein.

Upon detecting that the computing device is no longer idle or unattended, e.g., by detecting a logging in of a user, that a screen saver application has been terminated, by detecting input from a mouse or keyboard or by any means as known in the art, embodiments of the invention may purge the caching system (thus removing encrypted data from the caching system) and may allow the caching system to assume normal operation. A person of ordinary skill in the art may appreciate the flow described above. As known in the art, mixing encrypted and decrypted data in a single caching system may lead to undesirable consequences such as data corruption or may jeopardize data integrity. The method described herein enables embodiments of the invention to use a caching system for transferring encrypted data without jeopardizing data integrity. Alternatively or additionally, a caching system may be used to provide data to a backup system or agent by providing the caching system with decrypted data and selectively or conditionally encrypting data provided by the caching system, e.g., when data from the caching system is delivered to a backup agent or system, for example, as shown by block 255.

It will be noted that system 100 is an exemplary one, various modifications may be made without departing from the scope of the invention. For example, decryption unit 120 and encryption unit 135 may be combined into one module, likewise, driver 130 and driver 115 may be combined in typical implementations. While for simplicity, system 100 is described herein with reference to read operations, write operations are similarly supported. For write operations, the arrows shown in FIG. 1 should be reversed as well as when appropriate, the functionality of blocks 135 and 120. For example, a write operation by backup system 145 would be through driver 115 or decrypted by encryption unit 135 before entering caching system 125 and then encrypted by decryption unit 120. In a typical implementation, encryption/decryption units 135 and 120 may be combined into a single encryption/decryption unit thus any encryption/decryption operation required may be performed by a single module or unit. For the sake of simplicity, write operations will be scarcely described herein, how ever, it will be understood that write operations are supported by embodiments of the invention with the required applicable modifications.

Figure 2:
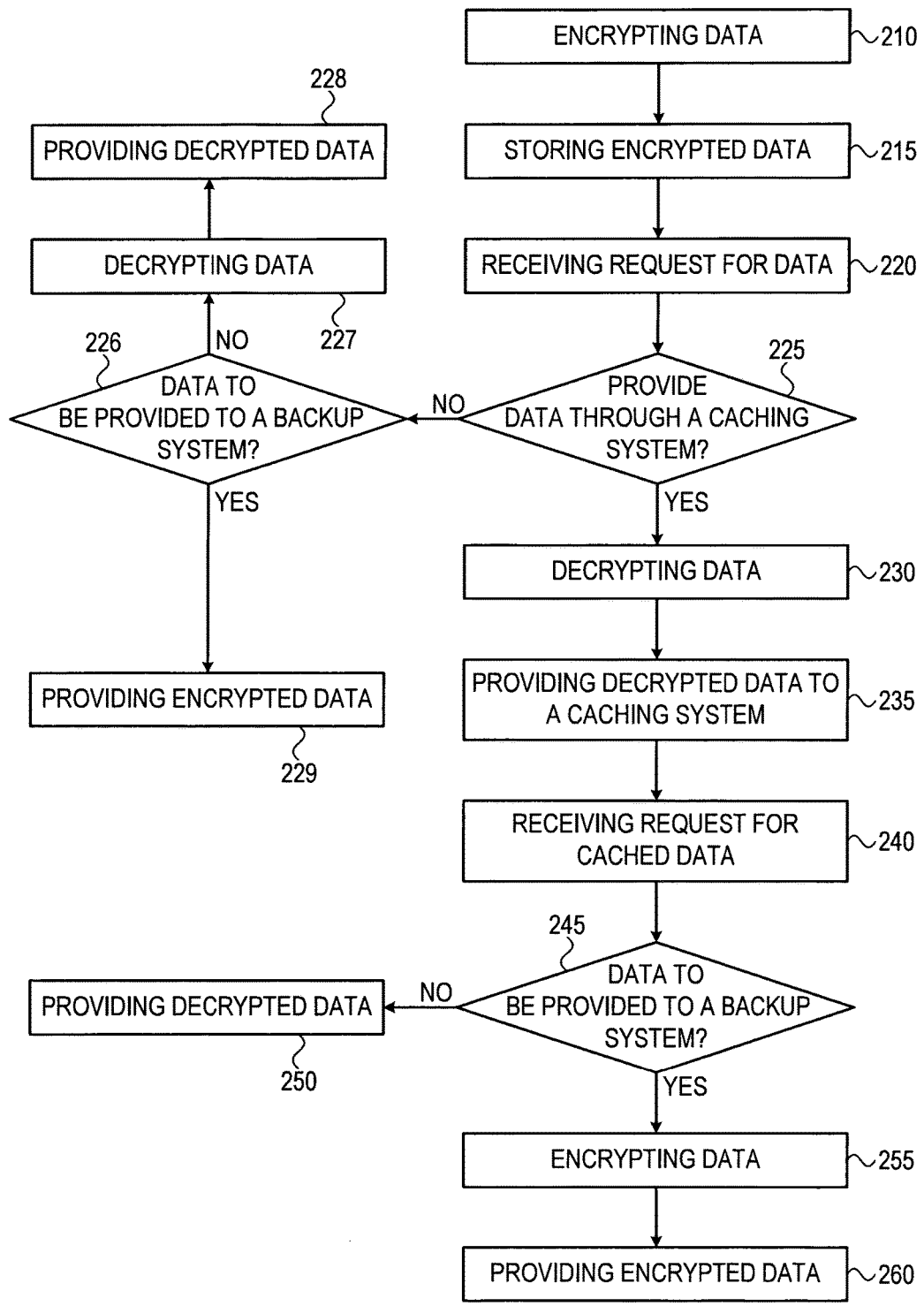
FIG. 2 is a schematic flow chart according to embodiments of the invention.

Reference is made to FIG. 2 showing a schematic flow chart according to embodiments of the invention. As shown by block 210, the flow may include encrypting data. For example, sensitive data produced by a user or application may be encrypted according to any rules or criteria. Any encryption method algorithm or system may be used to encrypt data without departing from the scope of the invention. As shown by block 215, the flow may include storing encrypted data. For example, encrypted data may be stored on storage 110 shown in FIG. 1. Such encrypted data may be encrypted on the computing device attached to the storage device, e.g., storage 110 or it may be imported, communicated or otherwise obtained, in encrypted form, e.g., from another computing device, from a removable storage media etc.

According to embodiments of the invention, any applicable and/or additional information, parameters, metadata or other data may be stored with encrypted data as shown by blocks 215 and/or 255. For example, encryption parameters or other information may be stored with decrypted data. For example, a decryption key that may be used to decrypt encrypted data may be embedded or otherwise associated with data when data is encrypted as shown by block 255. In some embodiments, encryption keys may themselves be encrypted and may further be stored in association with the relevant encrypted data. In some embodiments, decryption keys or other information may be embedded in the encrypted data. Associating of decryption keys with encrypted data may enable embodiments of the invention to decrypt encrypted data when retrieved from a backup system. For example, if data is backed up in encryption form it may later be decrypted by an embedded encryption/decryption key. This feature is further discussed herein.

An additional advantage that may be realized by embodiments of the invention is the ability to maintain a single key management system for backup and other encryptions. Current systems typically use a first encryption system and parameter set (e.g., encryption/decryption keys) for disk or other encryptions and a second system and parameter set for backup. This may be required by prior art as little or no association or linkage exist between the encryption system and the backup system. As the backup system is unaware of other security or encryption systems, an encryption key used for a backup system may be unrelated to any other encryption key, security or encryption systems used with relation to other operations, e.g., encryption of data on local disks. As a linkage or association of encryption and backup may exist in embodiments of the invention as described herein, e.g., data encryption is performed for data that is known to be specifically delivered to a backup system, embodiments of the invention may choose to use the same, similar or otherwise associated or related encryption parameters, e.g., encryption keys for disk encryption and for backup. Such choice may be dynamic and may be made, for example, prior to encrypting data as shown by block 255. A person of ordinary skill in the art will appreciate such advantage that may, for example, simplify a recovery system that may use a single set of parameters, e.g., when recovering data related to a local storage and when recovering data from a backup system.

As shown by block 220, the flow may include receiving a request for data. For example, a backup agent may request data from storage 110 in order to backup the data or a user may request data from storage 110 in order to view or use the data. As shown by block 225, the flow may include determining if data is to be provided through a caching system. For example, decryption unit 120 may deliver decrypted data to a requestor of the data or it may deliver decrypted data to caching system 125 as shown in FIG. 1. Determining whether data is to be provided through a caching system may be performed as known in the art, e.g., by examining and/or determining the destination of a data packet, examining a configuration of the system, e.g., use cache or not and/or observing related rules, configuration parameters or other criteria. Alternatively or additionally, determining a destination of data, e.g., determining if data is destined to a requestor of the data or to a caching system may be performed by analyzing a request for the data or it may be performed by analyzing a communication of the data, e.g., by analyzing a transfer of data from storage device 110, analyzing a disk operation or any other relevant event, for example, an operating system event at a kernel or user level.

As shown by block 226, the flow may include determining if data is to be provided to a backup system. For example, by comparing or otherwise relating parameters or values related to a request for the data to a list described herein driver 115 and/or decryption unit 120 may determine if data is to be provided to a backup system. For example, a process ID, process name or other parameters identifying the requesting process may be examined and, based on such parameters, it may be determined if the requestor is a backup system, application or related a backup process. For example, parameters related to a request for data or related to a communication of data may be compared or otherwise related to a list described herein and, based on such relating, it may be determined if the requestor or destination of data is a backup related entity, e.g., a backup agent, process, service or system.

As shown by block 227, the flow may include decrypting data. For example, if it has been determined, as shown by block 226 that data is not to be provided to a backup system, e.g., data is to be provided to an authenticated user, then data may be decrypted prior to being served or provided. As shown by block 228, the flow may include providing decrypted data. For example, if the requestor, destination or client of data from storage 110 is an authenticated user or appears in a list or configuration parameters described herein as one to be provided with decrypted data or otherwise meets a criteria or parameter as described herein then encrypted data stored on storage 110 may be decrypted prior to being delivered. For example, if preconfigured requirements are met, driver 115 may direct data from storage 110 to decryption unit 120 that may decrypt the data and further deliver decrypted data, e.g., as shown by the arrow connecting blocks 120 and 140 in FIG. 1. For example, if the requestor and/or destination of data is not a backup related process, agent, system or entity as determined as shown by block 226, then data may be decrypted as shown.

As shown by block 229, the flow may include providing encrypted data. For example, if it has been determined, as shown by block 226 that data is to be provided to a backup system then data may be provided in encrypted form, e.g., as produced as shown by block 210. For example, if the destination, requestor or client of data from storage 110 is a backup agent, driver 115 may provide or cause providing encrypted data by bypassing decryption unit 120 as shown by the arrow connecting blocks 115 and 145 in FIG. 1. According to embodiments of the invention, a backup agent may be provided with the ciphertext, that is the encrypted version of the data, e.g., as stored on a disk after being encrypted. As known in the art, in cryptography, ciphertext is the result of an encryption process of transforming information (typically referred to as plaintext) using an algorithm (e.g., a cipher) to make the text or plaintext unreadable. Such configuration, implementation or system enables benefits such as data security during network transmission, data security on a central or backup server, and data security during restore operations that may comprise communication or transmission of the data over a network etc. Accordingly, embodiments of the invention enable secured backup procedures as data may be provided or communicated to a backup system and stored by the backup system in encrypted, protected form. As described herein, e.g., with respect to filter driver 115 in FIG. 1, any manipulation of data may be performed prior to a delivery as shown by block 229.

According to embodiments of the invention, concurrent access operations, e.g., of a user and of a backup agent are enabled. Such concurrent access operations may be performed independently. For example, while a user may access data stored on a local disk where such access may be according to that user's permissions or other relevant parameters, a backup agent may access the same data according to a different set of permissions, security rules or policies or any other parameters. For example, a user may be provided with data as shown by blocks 227 and 228 while a backup agent may be provided with data as shown by block 229. In such case, providing data as shown by blocks 227 and 228 may be according to the user's permissions, and/or according to a relevant first set of rules, criteria or security policy parameters and providing data as shown by block 229 may be according to criteria or policy relevant to a backup agent. As described herein, providing data as shown by block 229 may include various manipulations of the data prior to providing it. For example as further described herein with respect to block 255. Although not shown, providing data as shown by block 229 may include associating data with various parameters. For example, an encryption key used to encrypt data may be embedded in the data itself and provided to a backup system, either embedded in the data or otherwise. As discussed herein, providing an encryption key with encrypted data may enable restoring encrypted data, e.g., by an administrator who has a master encryption key that may be used to decrypt a file encryption key embedded in the encrypted data. A further discussion of this feature may be found herein with relation to block 255. It will be recognized that any operations described with relation to block 255 may be performed prior to, or upon providing data as shown by block 229.

It will be noted that while a criteria such as whether delivery of data is to a backup system is described herein, any other or additional criteria may be applicable, used and/or acted by according to embodiments of the invention. For example, instead of, or in addition to, determining if data was requested by a backup system or is to be delivered to a backup system, filter driver 115 may check, determine, and/or take into account the user or application associated with data delivery. Accordingly, selectively providing encrypted or decrypted data or selectively encrypting data according to a first or second encryption key or other parameter and/or selectively associating or embedding parameters with delivered data may be performed based on any applicable criteria. Any parameters, rules, thresholds or criteria may be used in determining whether data is to be delivered in encrypted or decrypted form. For example, a time of day, an operational mode of the relevant computing device, e.g., stand by mode, a specific application running on the relevant computing device, e.g., is a screen saver active and the like may all be considered and relevant to determining the form of data to be delivered. Accordingly, any relevant information such as whether a user is logged in to the relevant computing device, the operational mode of the computing device, the applications running on the computing device and so on may be provided to or obtained by driver 115 and driver 130 and may be used as parameters based on which selective data delivery as described herein will be performed. The list described herein may include any relevant information that may be used in order to determine if data is to be provided in encrypted or decrypted form. For example, a field in the list described herein may indicate a time window when data is to be provided in encrypted form, an operational state of a computing device, an application currently running on the computing device or any applicable parameter that may cause embodiments of the invention to determine that data is to be provided in encrypted or decrypted form, the type of encryption and/or any parameters applicable to a delivery of data.

As shown by block 230, the flow may include decrypting data. For example, if it was determined that data is to be provided through a caching system as shown by block 225 then encrypted data may be decrypted prior to being delivered to the caching system. Such configuration may be desirable since it may be difficult to determine or foresee whether data from the caching system will be provided in encrypted or decrypted form. Data may be decrypted as shown by block 230 by, for example, encryption unit 120. As shown by block 235, the flow may include providing data to a caching system. For example, decryption unit 120 may provide decrypted data to caching system 125 as shown by the arrow connecting blocks 120 and 125 in FIG. 1. As shown by block 240, the flow may include receiving a request for cached data. For example, client 140 or backup system 145 shown in FIG. 1 may request data from caching system 125. Alternatively, an operating system or component or logic in an operating system may determine that data requested will be provided from a caching system.

As shown by block 245, the flow may include determining if data from a caching system is to be provided to a backup system. As described herein, embodiments of the invention may concurrently provide, from a single caching system, encrypted data to a backup agent and decrypted data to an authenticated user or application. For example, encrypted data from caching system 125 may be provided to a backup agent or system (e.g., backup system 145) and decrypted data from caching system 125 may be provided to a user or application (e.g., decrypted data client 140). According to embodiments of the invention, such concurrent data delivery may be performed simultaneously. As described herein, e.g., with reference to block 226, determining a destination of data may be performed by analyzing a request for the data or it may be performed by analyzing a communication of the data, e.g., by analyzing a transfer of data from storage device 110, a disk operation or any other relevant event, for example, an operating system event at a kernel or user level. It will be noted that while a criteria such as whether delivery of data from a caching system is to a backup system is described herein, any other or additional criteria may be applicable, used and/or acted by according to embodiments of the invention. For example, the criteria may be a user identification, a process identification, or any other parameters as described herein.

As shown by block 250, the flow may include providing decrypted data. For example, if driver 130 determines that decrypted data may be delivered from caching system 125, e.g., since the requestor is an authenticated user, then decrypted data from caching system 125 may be delivered as shown. As shown by block 255, the flow may include encrypting data. For example, driver 130 may intercept a request for or a transfer of data from caching system 125. Driver 130 may further determine, based on a list, criteria, rules or parameters described herein that data is to be provided in encrypted form, e.g., since the destination, requestor or client of the data is a backup system or agent. In such case, rather than directly delivering data from caching system 125 to its destination, driver 130 may direct data from caching system 125 to encryption unit 135. Encryption unit 135 may encrypt the data delivered to it thus producing encrypted data.

Conditionally or selectively providing encrypted data to a backup agent as described herein may enable embodiments of the invention to operate in unattended mode. Current systems typically require some form of authentication prior to a delivery of sensitive data. For example, sensitive data may be encrypted by such systems and may further be decrypted and provided in decrypted form only after an authentication of the client or destination of the data has been performed. Accordingly, such systems may be unable to provide sensitive data when or if no authentication has been performed, or in unattended mode, e.g., when no authenticated user is logged in. In contrast, the present invention may enable unattended mode, e.g., delivery of sensitive data to a backup agent when no authenticated user is logged in to the system or when no other authentication was performed. As described herein, embodiments of the invention may determine that data is to be delivered to a backup agent (or other identified and/or predetermined entity) and may deliver encrypted data to such entity, thus enabling an unattended backup mode of operation that may be highly desirable yet impossible by current systems.

When current backup systems obtain data for backup they do so independently of, or with no respect to a security or encryption system. Accordingly, when prior art backup systems perform backup they simply read the content from a storage device including metadata or other information. For example, if the relevant file system is a NTFS, access control lists (ACL), alternative data streams and or extended attributes may all be read by the backup system. When restoring data from a backup system, all these metadata are restored, thus enabling accessing the data. Accordingly, if some of such metadata is lost, corrupted or otherwise unavailable, data restored from a backup system may be useless. Furthermore, restoration or recovery of backed-up data may only be possible on the machine from which data was originally obtained since related metadata, e.g., encryption keys is required. For example, in (typical) cases where encryption keys are stored in a folder other than the folder being backed-up and later restored, if the folder containing the encryption keys is not present or encryption keys are otherwise unavailable, recovery of data from a backup system may be impossible.

In a first scenario, a prior art backup system reads or otherwise obtains unencrypted data or plaintext and stores such data on a backup system or server. As discussed herein, such mode of operation exposes data to various risks. By providing encrypted data to a backup system, embodiments of the invention solve this potential risk. In other cases related to prior art, data may be encrypted. In such cases, a prior art backup system will read encrypted data and store it on the backup system. Namely, current backup systems are unaware or indifferent as to whether or not data being backed-up is encrypted or not. As known in the art, in order to decrypt data that was previously backed-up, current systems need to restore the data to its original location, e.g., to a storage device attached to the original computing device and use a machine key stored on the computing device to decrypt the data. For example, when a user wants to decrypt data the user may use a password in order to obtain a machine key, use the machine key in order to decrypt a file key and use the decrypted file key to decrypt an encrypted file. Accordingly, current systems are limited in their ability to restore backed-up data. For example, prior art systems can not restore data from a backup system on any device or location of choice.

As described herein, by incorporating or otherwise associating encryption keys and other metadata or parameters with data being backed-up, providing such metadata to a backup system and storing encryption keys and other metadata with the backed-up data, embodiments of the invention enable restoration or recovery of backed-up data independent of the original location or computing device. For example, data previously backed-up from a first computing device may be restored or recovered using a second computing device or any applicable device or location.

As known in the art, an encryption of content may be according to the following paradigm. A file key is used to encrypt a file and a machine key is used to encrypt the file key. A user wanting to access information in the file uses a password in order to obtain the machine key, uses the machine key in order to decrypt the file key and uses the file key to decrypt the encrypted file. According to embodiments of the invention, a master key may be used to encrypt a file key. Such master key may be an asymmetric key, namely, the key used for encrypting the file key can not be used to decrypt the file key. Decryption of the file key may be possible by a second key that is typically owned and/or available to authorized personnel, e.g., a system administrator. According to embodiments of the invention, a file key encrypted by a master key as described herein may be embedded in the encrypted data or otherwise associated with the encrypted data prior to providing encrypted data to a backup system as shown by blocks 255 and/or 229. Accordingly, embodiments of the invention may provide a backup system or agent with encrypted data and with an encryption key that may be used (by an authorized entity in possession of a suitable decryption key) in order to decrypt the encrypted data.

It will be noted that providing an encryption key with the encrypted data as described herein may be done selectively or conditionally. For example, if it was determined that the client or destination of the encrypted data is a backup system then an encryption key may be generated, e.g., using a master key as described herein, and the encrypted encryption key may delivered with the encrypted data. In other cases, e.g., when encrypted data is to be provided to different clients or destination, generation and delivery of an encryption key may not be performed. For example, if a disk to disk operation is to simply copy encrypted data from one disk to another then no decryption key may be generated or provided. According to embodiments of the invention, any metadata, parameters or information may be selectively or conditionally generated, obtained and provided to a backup system or backup agent as shown by blocks 229 and 255. Embodiments of the invention provide at least two ways of recovering or restoring backed-up data. The first being similar to that enabled by prior art. Data from a backup system may be restored to the original computing device, a user may then use his password or otherwise obtain the machine key stored on the original computing device, use the machine key to decrypt a file key stored on the original computing device and use the decrypted file key to decrypt the file. The second method is impossible according to prior art systems. According to embodiments of the invention, a (possibly privileged) user, e.g., an administrator may retrieve backed-up data and store it on any device or in any location, use a master key to decrypt an encryption key associated with the encrypted data and use the decrypted key to decrypt the data. The advantages of being able to freely recover backed-up data on any device or location, independent from the original device where data was stored prior to being backed-up are obvious and would be highly appreciated by any person of ordinary skill in the art.

As shown by block 260, the flow may include providing encrypted data. For example, encrypted data produced by encryption unit 135 as described herein may be delivered to its destination or client that may be a backup agent or entity.

Figure 3:
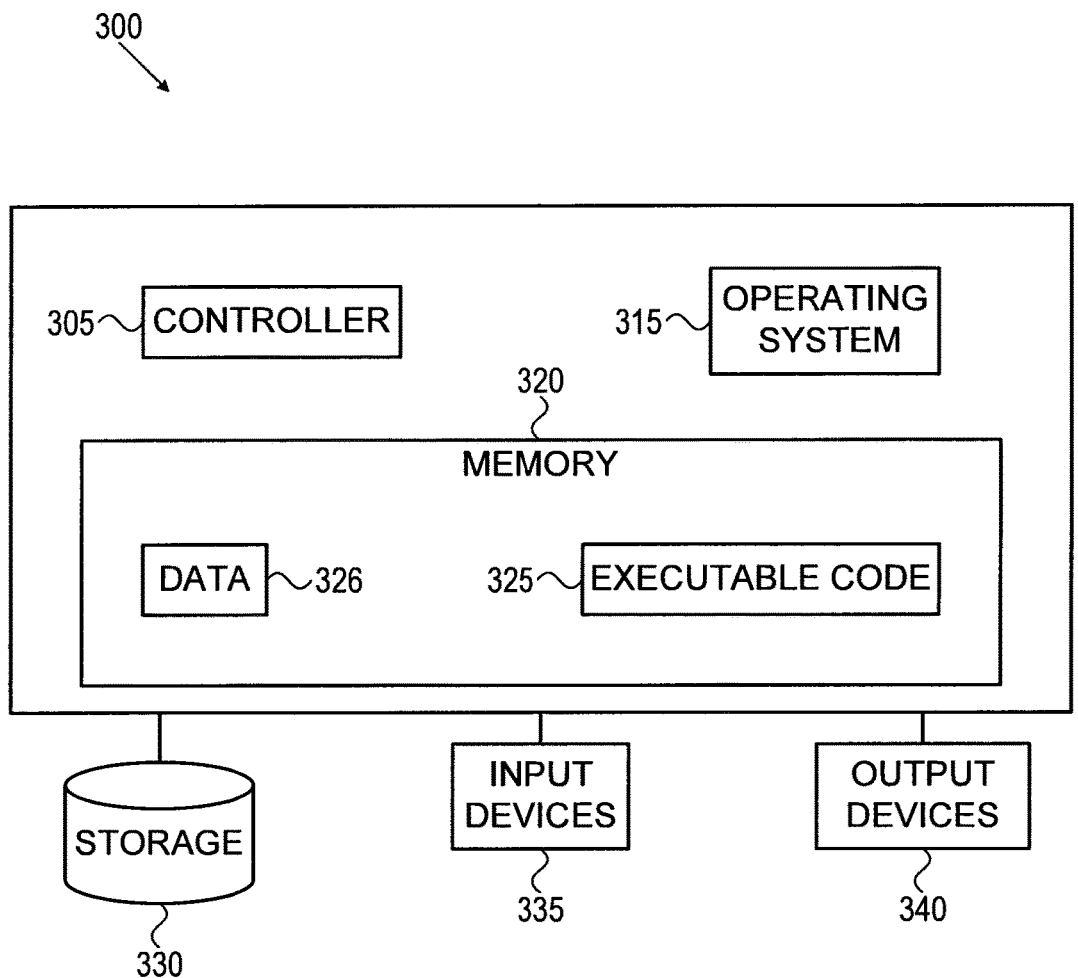
FIG. 3 is an exemplary computing device according to embodiments of the invention.

Reference is made to FIG. 3, showing high level block diagram of an exemplary computing device according to embodiments of the present invention. Computing device 300 may include a controller 305 that may be, for example, a central processing unit processor (CPU), a chip or any suitable computing or computational device, an operating system 315, a memory 320, a storage 330, an input device 335 and an output device 340.

Operating system may be or may include any code segment designed and/or configured to perform tasks involving coordination, scheduling, arbitration, supervising, controlling or otherwise managing operation of computing device 300, for example, scheduling execution of programs. Operating system 315 may be a commercial operating system. Memory 320 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 may be or may include a plurality of, possibly different memory units.

Executable code 325 may be any executable code, e.g., an application, a program, a process, task or script. Executable code 325 may be loaded into memory 320 as shown and may be executed by controller 305 possibly under control of operating system 315. Data 326 may be any data, information or parameters loaded into memory 320 and may be used by executable code 325. For example, executable code may be or may include filter drivers 115 and/or 130, or it may be or may include one of or both encryption and decryption units 120 and 135 respectively. Data 325 may be a list or other structure containing rules, criteria or parameters based on which filter drivers 120 and/or 130 determine how data is to be delivered as described herein.

Storage 330 may be or may include, for example, a hard disk drive, a floppy disk drive, a Compact Disk (CD) drive, a CD-Recordable (CD-R) drive, a universal serial bus (USB) device or other suitable removable and/or fixed storage unit. For example, storage 330 may be or may be similar to storage 110 shown in FIG. 1 and described herein.

Input devices 335 may be or may include a mouse, a keyboard, a touch screen or pad or any suitable input device. It will be recognized that any suitable number of input devices may be operatively connected to computing device 300 as shown by block 335. Output devices 340 may include one or more displays, speakers and/or any other suitable output devices. It will be recognized that any suitable number of output devices may be operatively connected to computing device 300 as shown by block 340. Any applicable input/output (I/O) devices may be connected to computing device 300 as shown by blocks 335 and 340. For example, a network interface card (NIC), a printer or facsimile machine, a universal serial bus (USB) device or external hard drive may be included in input devices 335 and/or output devices 340.

Embodiments of the invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. For example, a storage medium such as memory 320, computer-executable instructions such as executable code 325 and a controller such as controller 305. Some embodiments may be provided in a computer program product that may include a machine-readable medium, stored thereon instructions, which may be used to program a computer, or other programmable devices, to perform methods as disclosed above.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
by a computerized platform, selectively providing data to different computerized processes that are associated with said computerized platform, wherein said providing comprises selectively providing data to a data-requesting process either in encrypted form or in decrypted form, by performing:
(a) storing encrypted data in a local storage unit of said computerized platform;
(b) analyzing a request, that was received from said data-requesting process which requests said encrypted data from said local storage unit;
(c) retrieving a set of one or more parameters that are associated with said data-requesting process;
(d) retrieving a pre-defined security policy that is associated with at least one parameter of said set of one or more parameters of said data-requesting process;
(e) determining whether (I) the set of one or more parameters of said data-requesting process, corresponds to (II) said security policy applied to at least one of said parameters;
(f) based on said one or more parameters of said data-requesting process, and based also on said pre-defined security policy that is associated with at least one parameter of said set of one or more parameters of said data-requesting process, determining both; (I) whether to provide said data to said data-requesting process in encrypted form or in decrypted form, and also (II) which encryption key to utilize if said data is to be provided in encrypted form to said data-requesting process;
performing kernel-level analysis of a destination of a data packet, by a kernel-level module that monitors at kernel level one or more requests for data;
based on kernel-level analysis by the kernel-level module of a kernel-level operating system event, determining whether or not said destination is part of a back-up system;
if it is determined, based on the kernel-level analysis of the kernel-level operating system event, that said destination is part of the backup system then; delivering said data in encrypted format to said destination;
if it is determined, based on the kernel-level analysis of the kernel-level operating system event, that said destination is not park of the backup system then: delivering said data in decrypted format to said destination.

2. The method of claim 1, comprising:
determining whether the data-requesting process is associated with a backup system;
if said data-requesting process is associated with said backup system, then: encrypting said data, and delivering said data in encrypted form to said data-requesting process;
if said data-requesting process is not associated with said backup system, then; delivering said data in decrypted form to said data-requesting process.

3. The method of claim 1, wherein the analyzing of step (b) comprises: intercepting a data-access request of said data-requesting process.

4. The method of claim 1, comprising:
concurrently providing a data item in two different formats to two different requesting processes, by: (a) determining that a first requesting process is an authorized logged-in user; (b) delivering said data item in decrypted format to said authorized logged-in user; (c) determining that a second, concurrent, requesting process is a backup module; (d) delivering said data item in encrypted format to said second, concurrent, requesting process.

5. The method of claim 1, comprising:
selectively determining whether to provide a data item to a requesting process, either in decrypted format or in encrypted format, based on classifying the requesting process as one of: (i) the requesting process is an authorized logged-in user, or (ii) the requesting process is a locally-running backup module, or (iii) the requesting process is a remote backup module that is requesting the data item through a shared network drive mechanism, or (iv) the requesting process is a non-backup requesting process.

6. The method of claim 1, comprising:
defining and applying at least four different security policy rules, which selectively determine whether to provide a data item to a requesting process either in decrypted format or in encrypted format, by defining at least;
(i) a first security policy rule that applies when the requesting process is an authorized logged-in user,
(ii) a second security policy rule that applies when the requesting process is a locally-running backup module,
(iii) a third security policy rule that applies when the requesting process is a remote backup module that is requesting the data item through a shared network drive mechanism,
(iv) a fourth security policy rule that applies when the requesting process is a non-backup data-requesting process.

7. The method of claim 1, comprising:
selectively determining whether to deliver a requested data item, either in decrypted format or in encrypted format, to said data requesting process, based cumulatively on both: (a) classification of said data requesting process into either a backup module or a non-backup module, and (b) a pre-defined security policy rule that indicates a first time-window in which data is provided in encrypted form and further indicates a second time-window in which data is provided in decrypted form.

* * * * *